July 23, 1940.  C. C. FARMER  2,208,756
COMPRESSED AIR DEHYDRATING APPARATUS
Filed Aug. 12, 1938  4 Sheets-Sheet 1

INVENTOR
CLYDE C. FARMER
BY
ATTORNEY

July 23, 1940.  C. C. FARMER  2,208,756
COMPRESSED AIR DEHYDRATING APPARATUS
Filed Aug. 12, 1938   4 Sheets-Sheet 2

INVENTOR
CLYDE C. FARMER
BY
ATTORNEY

July 23, 1940.  C. C. FARMER  2,208,756
COMPRESSED AIR DEHYDRATING APPARATUS
Filed Aug. 12, 1938    4 Sheets-Sheet 3
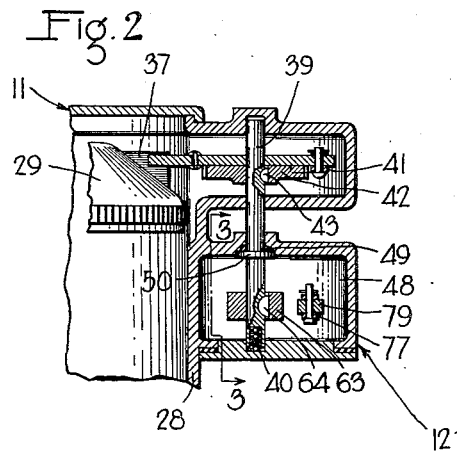
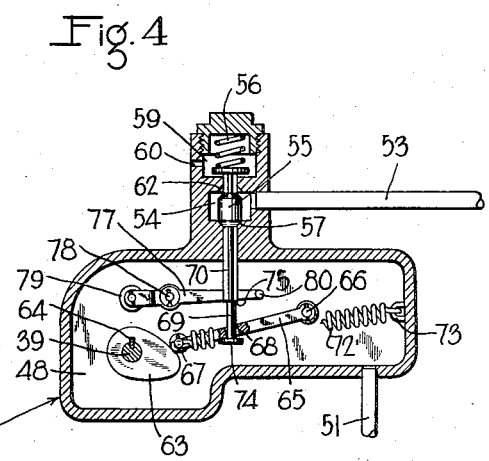
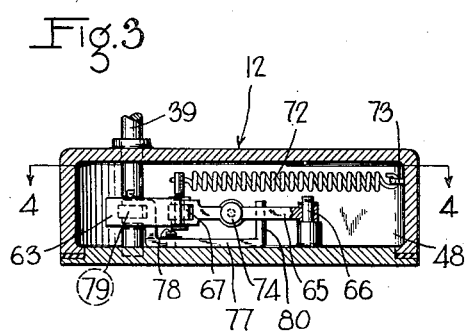
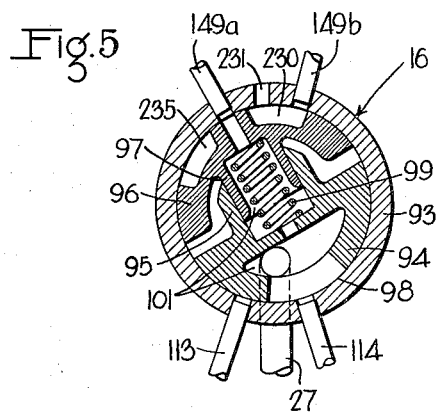
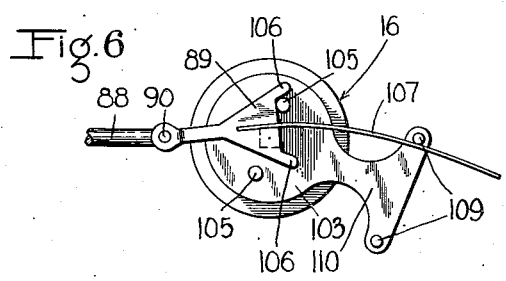
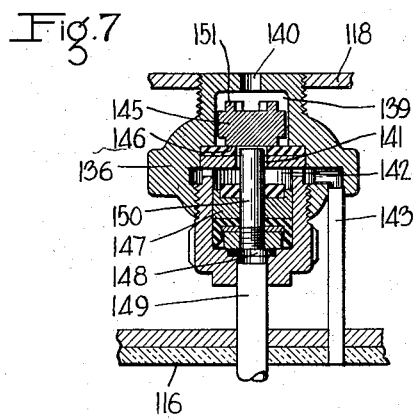
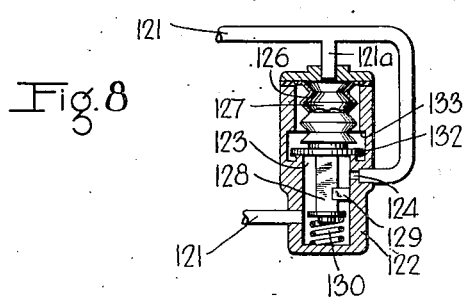
INVENTOR
CLYDE C. FARMER
BY A. M. Higgins
ATTORNEY July 23, 1940.  C. C. FARMER  2,208,756
COMPRESSED AIR DEHYDRATING APPARATUS
Filed Aug. 12, 1938   4 Sheets-Sheet 4

INVENTOR
CLYDE C. FARMER
BY
A. M. Wiggins
ATTORNEY

Patented July 23, 1940

2,208,756

UNITED STATES PATENT OFFICE 2,208,756

COMPRESSED AIR DEHYDRATING APPARATUS

Clyde C. Farmer, Pittsburgh, Pa., assignor to The Westinghouse Air Brake Company, Wilmerding, Pa., a corporation of Pennsylvania Application August 12, 1938, Serial No. 224,464

17 Claims. (Cl. 257—3)

This invention relates to air conditioning systems and more particularly to an improved apparatus for dehydrating compressed air for use in air brake systems and the like.

It is known that when atmospheric air is suitably compressed for use in a railway air brake system or the like, the water vapor content of the air under pressure is usually relatively high, and that this moisture is precipitated out of the air only after the heat of compression is dissipated therefrom and the air is thus cooled to substantially atmospheric temperature. This water vapor must be substantially removed from the hot compressed air supplied by the locomotive compressor to the train brake system before the air reaches the pipes leading to the brake controlling valve devices on the locomotive and on the cars, in order to prevent the local precipitation of water (due to either cooling or expansion of the air) in such quantities as might destroy the lubricant in the valve mechanisms or result in a frozen brake pipe during cold weather. It has been found that the means commonly provided on locomotives for initially ridding the compressed air of moisture, including radiating pipes for conducting the air from the compressor to a pair of connected main reservoirs, may not always function to effect the necessary cooling, so that sufficient water vapor may be carried into the brake pipe to cause undesired interference with the operation of the air brake system.

One object of my invention is to provide improved apparatus which is automatically operative to effect removal of moisture from fluid compressed by a compressor.

Another object of the invention is to provide fluid dehydrating apparatus of compact and efficient design adapted for continuous or intermittent operation to dissipate heat of compression from fluid compressed by a compressor, so as to effect precipitation of moisture therefrom, and to collect and discharge the precipitated moisture for preventing excessive water vapor from passing with the fluid under pressure into the receiving reservoir or system.

A further object of my invention is to provide an improved compressed air dehydrating apparatus adapted to be carried by a vehicle in a train for conditioning the compressed air for use in the air brake system, and automatically operative with the usual locomotive compressor for promptly cooling the air compressed thereby in order to effect precipitation and discharge of substantially all of the moisture from the compressed air before the supply thereof to the brake pipe and the brake controlling valve devices.

It is still another object of my invention to provide a compressed air dehydrating apparatus adapted to be carried by a vehicle in the train, comprising a pair of cooling condensers interposed between the compressor and the receiving reservoir, a change-over valve device operative in accordance with operation of the compressor, or in response to action of an auxiliary control device, for supplying air compressed by the compressor to the reservoir by way of one or the other of the condensers alternately, and automatic heat transfer means including valves interlocked with the change-over valve device for effecting circulation of cool air over the active condenser, while conditioning the non-active condenser for subsequent use by causing discharge of accumulated moisture therefrom with the aid of heated air during freezing weather.

Other objects and advantages of the invention will appear in the following more detailed description thereof, taken in connection with the accompanying drawings, wherein Figs. 1 and 1A, taken together, constitute a diagrammatic view, partly in section, of a locomotive compressor equipment having associated therewith a dehydrating apparatus constructed according to the invention;

Fig. 2 is a fragmentary sectional view taken along the line 2—2 of Fig. 1;

Fig. 3 is a sectional view taken on the line 3—3 of Fig. 2;

Fig. 4 is a sectional view taken substantially on the line 4—4 of Fig. 3;

Fig. 5 is a sectional view of the change-over valve device shown in Fig. 1A;

Fig. 6 is a plan view showing the same valve device in another position thereof;

Figs. 7 and 8 are sectional views of a drain valve and a check valve, respectively, associated with each condenser shown in Fig. 1A.

Figure 1:
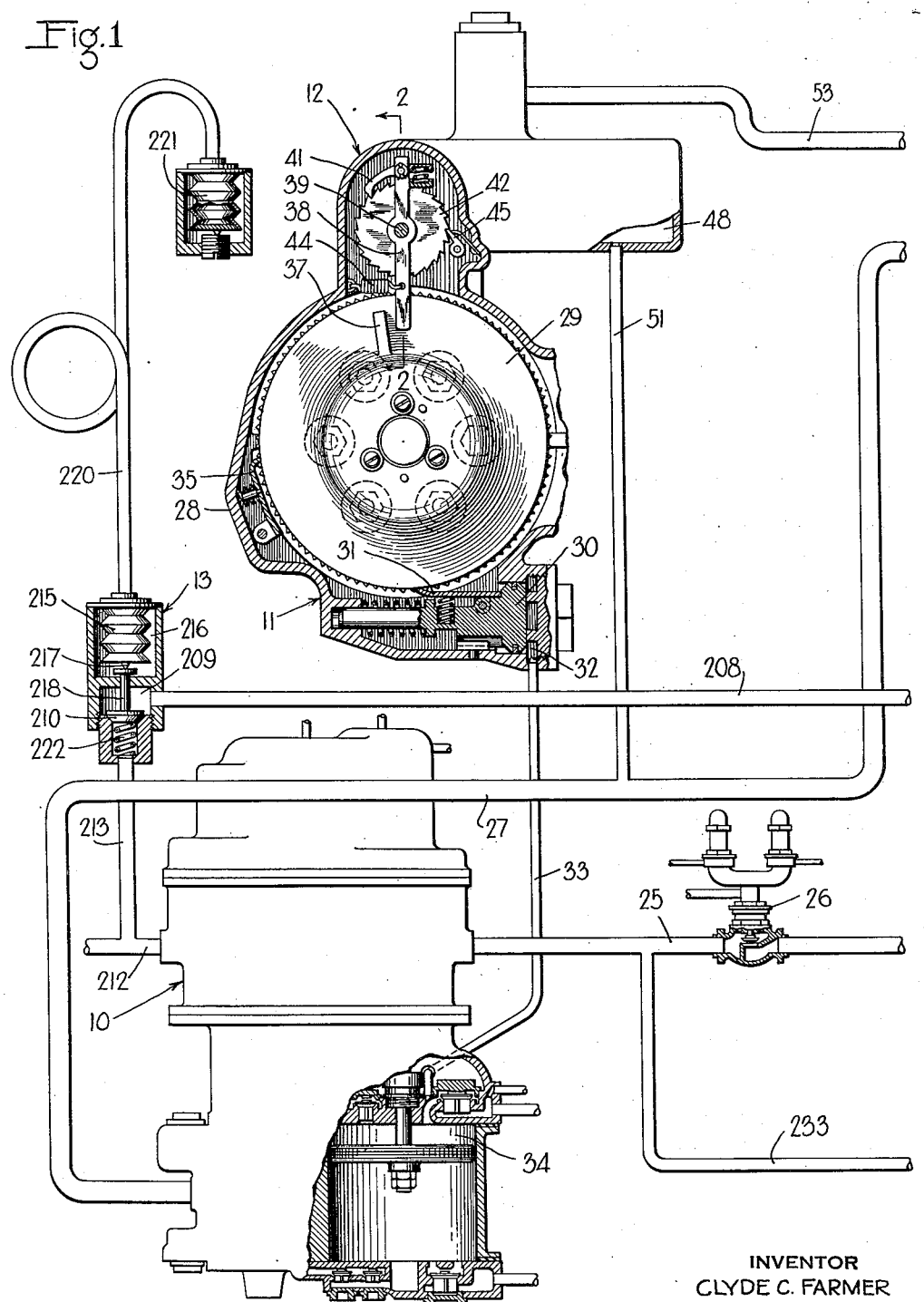
Figure 1A:
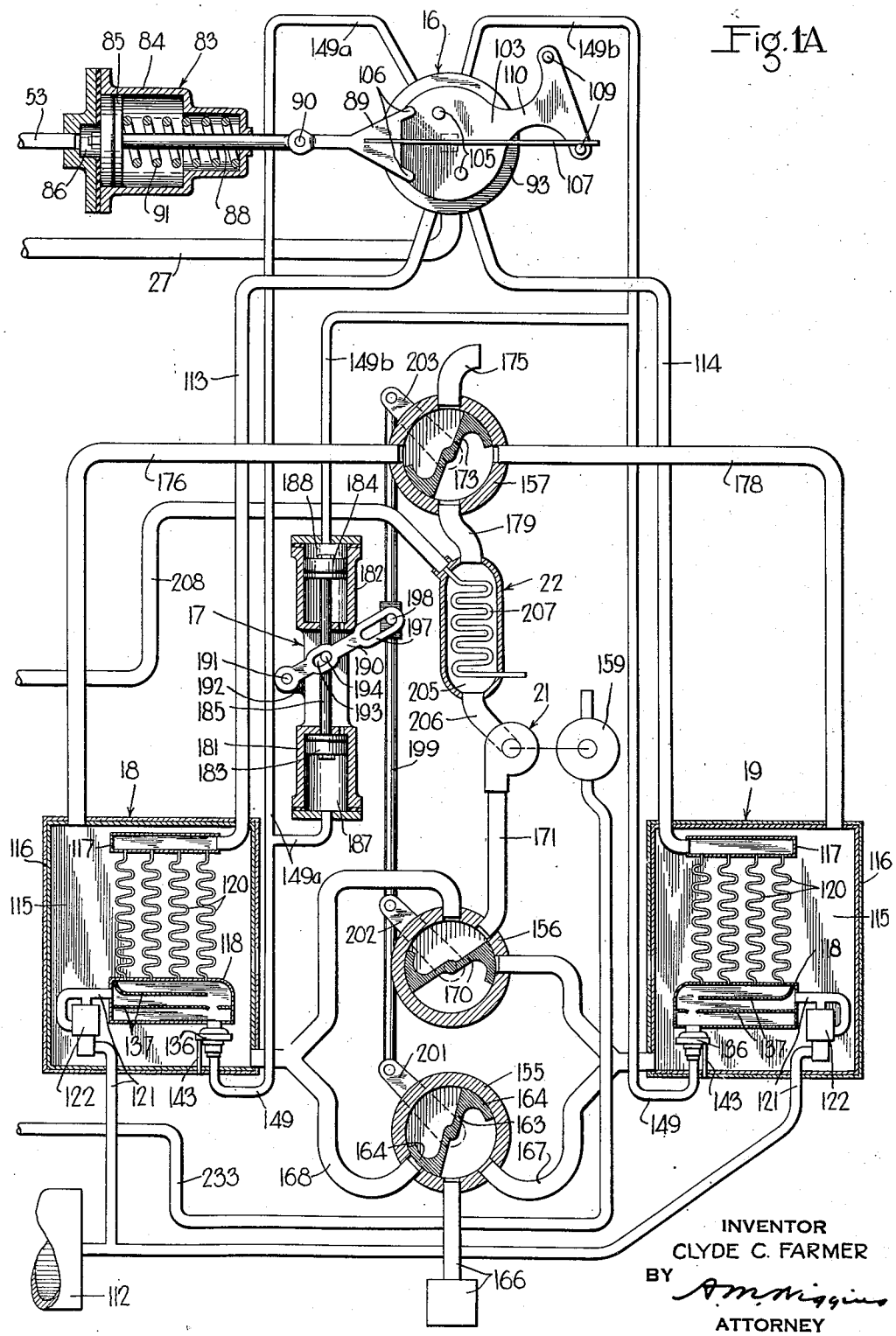

*Description of apparatus shown in Figs. 1 and 1A*

Referring to Figs. 1 and 1A of the drawings, the equipment shown therein is adapted to be carried on a locomotive, and comprises a steam driven compound compressor 10, a lubricator mechanism 11 having associated therewith a timing valve device 12, a thermostatic control device 13, a change-over valve device 16, an automatic valve controlling mechanism 17, a pair of condenser assemblies 18 and 19, a power driven blower 21, and a heating device 22.

The compressor 10 is of the well known cross-compound type and is adapted to be operated by steam supplied from the boiler through a pipe 25 having the usual compressor governor 26 interposed therein. The compressor 10 is operative to supply air under pressure to a pipe 27.

The lubricating mechanism 11 may be of any suitable mechanically actuated type, and as illustrated is similar to that shown and described in my Patent No. 2,014,886, issued September 17, 1935. Only such elements of the lubricating mechanism 11 as are essential for driving the timing valve device 12 associated therewith are shown in Fig. 1, including a casing 28 having rotatably mounted therein a ratchet wheel 29, which is adapted to be turned in a clockwise direction by operation of a fluid pressure actuated mechanism comprising a piston 30 mounted in a suitable bore in the casing and carrying a spring-pressed pawl 31 engageable with the teeth of the ratchet wheel 29. The piston 30 is subject to variations in fluid pressure in a chamber 32 which communicates by way of a pipe 33 with one of the compression chambers 34 of the compressor 10. A stationary spring-pressed pawl 35 is provided for preventing counterclockwise rotation of the ratchet wheel 29. According to the invention, the ratchet wheel 29 has formed thereon a lug 37 which is adapted upon each revolution of the ratchet wheel to engage the end of a lever 38, which is rotatably mounted on a shaft 39 suitably journaled in the casing of the timing valve device 12, as is shown in Fig. 2 of the drawings.

As shown in Figs. 1 and 2, a spring-pressed pawl 41 is pivotally connected to the outer end of the lever 38, which pawl is adapted for interlocking engagement with the teeth of a ratchet wheel 42 that is secured to the shaft 39 by means of a key 43. A tension spring 44 is connected to the casing and to the end of the lever 38 adjacent the ratchet wheel 29 for biasing the lever 38 in a clockwise direction toward the normal position shown in Fig. 1. Clockwise rotation of the ratchet wheel 42 and of the shaft 39 connected thereto is prevented by means of a spring-pressed pawl 45 which engages the teeth of the ratchet wheel and is pivotally connected to the casing.

As shown in Fig. 2 of the drawings, an end of the shaft 39 extends into a pressure chamber 48, which is formed in the casing of the timing device 12 and is sealed by suitable packing means including a packing 49 interposed between the casing and a collar 50 formed on the shaft 39. A spring 40 acting on the shaft maintains the packing means effective. The pressure chamber 48 is connected by way of a pipe 51 with the air supply pipe 27, and communicates through a suitable bore with a valve chamber 54 formed in the casing, as shown in Fig. 4 of the drawings, which chamber 54 is connected to a pipe 53 and contains a valve 55. A spring 56 is provided for urging the valve 54 into engagement with a valve seat 57 for cutting off communication between the chambers 48 and 54, while maintaining communication from the latter chamber with the atmosphere by way of a chamber 59 and an opening 60. The valve 55 is adapted to be shifted into engagement with a seat 62 against the force of the spring 56 for cutting off communication from the valve chamber 54 to the atmosphere and for establishing communication between the pressure chamber 48 and the valve chamber, by operation of a valve actuating mechanism mounted in the chamber 48.

The valve actuating mechanism comprises a rotatable cam 63 which is secured to the shaft 39 by means of a key 64, and a toggle lever 65, which has one end thereof pivotally mounted on a pin 66 carried by the casing and carries on the other end thereof a roller 67 adapted for engagement with the cam 63. Formed in the toggle lever 65 intermediate its ends is a bore 68, through which extends an end 69 of a fluted stem 70 which is secured to the valve 55. A toggle spring 72, shown in fragmentary form in Fig. 4, is secured to the end of the toggle lever 65 adjacent the roller 67 and to an element 73 carried by the casing, and functions to urge the toggle lever out of its dead-center position either into engagement with a head 74 or a shoulder 75 of the fluted stem 70, according to the operation of the cam 63. A toggle return lever 77 is pivotally mounted intermediate its ends on a pin 78 carried by the casing, and carries on one end a roller 79 engageable with the cam 63 and on the opposite end a lug 80, which is suitably offset for engagement with a surface of the toggle lever 65 between the pin 66 and the bore 68 thereof during cooperation of the cam 63 with the roller 79 as hereinafter explained.

The valve mechanism of the timing valve device 12 just described is adapted to control the supply of fluid under pressure to a pressure responsive valve actuating apparatus 83, which is provided for actuating the change-over valve 16, shown in Fig. 1A of the drawings. The apparatus 83 comprises a cylinder 84 within which is slidably mounted a piston 85 having formed at one side thereof a chamber 86 communicating with the pipe 53. The piston 85 has a stem 88 which extends through a suitable bore formed in the cylinder 84 and has the outer end thereof pivotally connected to a latch element 89 by means of a pin 90. A spring 91 is interposed between the piston 85 and a wall of the cylinder 84 for urging the piston 85, stem 88 and latch element 89 to a normal or retracted position as shown in Fig. 1A.

The change-over valve 16 with which the pressure responsive device 83 is associated comprises a casing 93 having mounted therein a rotary valve assembly, which, as best shown in Fig. 5 of the drawings, includes a semi-circular valve element 94 having parallel flanges 95, and a similarly formed valve element 96 having a pair of flanges 97 slidably fitted within the flanges 95. A coil spring 99 is interposed between the associated valve elements 94 and 96 for urging them into sealing engagement with an annular valve seat 98 formed within the casing 93. A central cavity 101 is defined within the connected valve elements 94 and 96 and communicates at all times with the supply pipe 27.

As shown in Fig. 1A, the valve elements of the changeover valve device 16 are adapted to be moved to either one of two positions through the medium of a suitable operating device, which by way of illustration is shown in the form of a shifting element 103, which may be secured to the valve elements 94 and 96 by any suitable means, not shown, and which is adapted for rotary movement through an arc of about forty-five degrees upon each stroke of the piston 85 and associated latch element 89, as hereinafter more fully explained. Two projecting pins 105 are secured to the element 103 at points diametrically equidistant from the center thereof, each of which pins is aligned for interlocking engagement in one of two outwardly inclined lugs 106 formed on the latch member 89. The relative spacing of the pins 105 and the lugs 106 is such that upon movement of the latch member 89 toward the shifting element 103, only one of the lugs can interlock with the corresponding pin, while the other lug is adapted to clear the adjacent pin to permit rotation of the shifting element, as will be understood by reference to Fig. 6. Secured to the latch member 89 intermediate the lugs 106 is an elongated spring or flexible rod 107, which extends between and is in operative alignment with two spaced pins 109 carried on an arm portion 110 projecting radially from the shifting element 103. The pins 109 are disposed on the portion 110 in substantially parallel alignment with the pins 105, and serve to guide the flexible rod 107 during operation of the valve actuating device 83, shown in Fig. 1A, for positioning the latch element 89 for engagement with each of the pins 105 in alternation, as hereinafter more fully explained.

The change-over valve device 16 is adapted to be positioned for supplying compressed air from the compressor, delivered by way of the pipe 27, to the usual main reservoir, which is designated 112 in Fig. 1A of the drawings, either by way of a pipe 113 and the condenser assembly 18 or through a pipe 114 and condenser assembly 19. Each of the condenser assemblies 18 and 19 comprises a housing 116 enclosing a chamber 115, which is sealed from the atmosphere and insulated against heat exchange with the outer atmosphere. In each chamber are mounted an upper header 117 communicating with the pipe 113 or pipe 114, a lower header 118, and a plurality of cooling tubes 120 having their inlet ends connected to the header 117 and their outlet ends connected to the header 118. The lower header 118 communicates with the main reservoir 112 through a pipe 121 having interposed therein a check valve device 122, which is mounted within the housing 116, and is illustrated in detail in Fig. 8 of the drawings.

Referring to Fig. 8, the check valve device 122 comprises a casing having a chamber 123, which is connected to the portion of the pipe 121 leading to the main reservoir 112, and also communicates through a port 124 with the portion of pipe 121 leading from the lower header 118 of the condenser assembly 18. Mounted within the chamber 123 is a collapsible bellows diaphragm 126, which encloses a chamber 127 communicating through a branch pipe 121a with the condenser portion of the pipe 121, and which diaphragm is operatively connected by means of a stem 128 to a slide valve 129 controlling communication between the port 124 and chamber 123. The bellows diaphragm 126 is adapted to be maintained expanded as shown in Fig. 8 under the pressure of air being supplied through the associated condenser and the pipe 121, thereby positioning the slide valve 129 to permit communication from the port 124 to the chamber 123. A spring 130 is interposed between the free end of the stem 128 and the wall of chamber 123 for biasing the stem and slide valve 129 toward a closed position, wherein the slide valve is adapted to cover the port 124 while a collar 132 carried by the stem is brought into engagement with a shoulder 133 formed in the casing and the bellows diaphragm 126 is then partially collapsed, this position being assumed by the check valve device when the supply of air under pressure by way of the condenser and the pipe 121 is discontinued, as hereinafter explained.

Referring again to Fig. 1A of the drawings, the lower condenser header 118 of each of the condenser assemblies 18 and 19 has associated therewith a drain valve device 136, which is connected to the header below the lower of a pair of horizontally disposed apertured baffle walls 137 mounted within the header. The drain valve device 136 is illustrated in detail in Fig. 7 of the drawings, and comprises a casing having a valve chamber 139 communicating through a passage 140 with the header 118, and by way of a bore 141 and a chamber 142 with a drain pipe 143, which extends downwardly and outwardly of the housing 116. A check valve 145 is disposed in the valve chamber 139 and is adapted to engage a seat gasket 146 secured within the casing for cutting off communication between the valve chamber and the bore 141, under the force of gravity acting on the valve and of the pressure of air in the condenser header 118 and in the chamber 139.

When the condenser assembly with which the drain valve device 136 is associated is cut out of operation in the manner hereinafter described, the check valve 145 is adapted to be unseated by operation of a piston 147, which is mounted in a suitable bore formed in the casing of the device and is subject to the pressure of fluid in a chamber 148 communicating by way of a pipe 149 and either a pipe 149a or 149b with the seat of the change-over valve device 16, as shown in Fig. 1A. The piston 147 has secured thereto a vertically disposed rod 150 extending through the chamber 142 and bore 141 into operative alignment with the check valve 145, the piston and rod being normally positioned under the force of gravity for permitting the check valve to remain seated as shown in Fig. 7. It will be noted that the check valve 145 is provided with a plurality of lugs 151 which are engageable with the upper wall of the chamber 139 for limiting upward movement of the valve by operation of the piston 147.

According to my invention, means is provided for circulating cold or hot air as desired over the various elements within the housings of each of the condenser assemblies 18 and 19, which air circulation means is controlled in accordance with the positioning of the change-over valve device 16, by operation of the valve actuating device 17. As shown in Fig. 1A of the drawings, the air circulating apparatus comprises, in addition to the valve actuating device 17, blower device 21 and air heating device 22, three reversing valve devices 155, 156 and 157, and a suitable motor for operating the blower device such as a steam turbine 159.

The reversing valve device 155 comprises a circular casing having a bore formed therein within which is rotatably mounted a valve element 163 having a pair of oppositely disposed shoe portions 164 which engage the surface of the bore for controlling communication from an intake pipe and strainer 166 to either a conduit 167 or a similar conduit 168, according to the position of the valve device. The conduits 167 and 168 communicate with the lowermost portions of the chambers 115 of the condenser assemblies 19 and 18, respectively, and both conduits are also connected to the reversing valve device 156, which comprises a casing having a bore formed therein and a rotary shoe valve element 170 operatively mounted in the bore for establishing communication between one or the other of the conduits 167 and 168 and a conduit 171 leading from the outlet of the blower device 21.

The reversing valve device 157 is similar to the valve devices 155 and 156, and comprises a casing having a bore in which is operably mounted a rotary shoe valve element 173, which is adapted to be moved to either of two positions. When the rotary shoe valve element 173 is positioned as shown in Fig. 1A, communication is maintained between an atmospheric exhaust pipe 175 and a conduit 176 connected to the uppermost portion of the chamber 115 of the condenser 18, while at the same time communication is maintained from a similar conduit 178 leading from the uppermost portion of the chamber 115 within the condenser assembly 19 to a conduit 179, which is in turn connected to the heating device 22.

The reversing valve devices 155, 156 and 157 are adapted to be operated by the fluid pressure responsive valve actuating device 17, which comprises a pair of aligned stationary cylinders 181 and 182, having suitable bores within which are mounted pistons 183 and 184, respectively, connected together by means of a single piston rod 185. The piston 183 has formed at one face thereof a piston chamber 187 communicating through pipe 149a with a port in the seat of the change-over device 16. Similarly, the piston 184 is subject to fluid pressure in a piston chamber 188 which is connnected by way of pipe 149b with another port in the seat of the change-over valve device. The pistons 183 and 184 are adapted to actuate the reversing valves 155, 156 and 157 through the medium of a lever mechanism including a lever 190 having one end thereof pivotally connected by means of a pin 191 to an offset lug 192 provided on the casing of the device 17 intermediate the cylinders, and which lever has a centrally disposed slot 193 receiving a pin 194 that is carried by the piston rod 195. The free end of the lever 190 has formed therein another slot 197 into which is operatively engaged a pin 198 carried by a movable operating rod 199, which is disposed substantially parallel to the piston rod 185. The operating rod 199 is in turn pivotally connected to the ends of three valve levers 201, 202 and 203, which are keyed or otherwise suitably secured to the rotary shoe valves 163, 170 and 173, respectively.

The heating device 22 may be of any suitable type, and as illustrated comprises a casing having a chamber 205 communicating with the conduit 179 and also with a conduit 206 which is connected to the inlet duct of the blower device 21. Mounted within the chamber 205 of the heating device is a heating coil 207 which is adapted to be supplied with steam for heating the air passing through the chamber 205 when the temperature of the atmospheric air is below a predetermined degree. The heating coil 207 is connected to a pipe 208, which, as shown in Fig. 1 of the drawings, communicates with a valve chamber 209 formed in the casing of the thermostatic control device 13.

A valve 210 is disposed in the chamber 209 of the control device 13 for controlling the flow thereto of steam discharged from the compressor 10 by way of the usual steam discharge pipe 212 and a branch pipe 213. Although any suitable type of temperature responsive device may be employed for controlling the supply of steam to the pipe 208, the thermostatic control device 13 as illustrated comprises a bellows diaphragm 215, which is mounted in a chamber 216 and carries on the movable end thereof a boss portion 217 adapted to engage the end of a stem 218 of the valve 210. The chamber within the bellows diaphragm 215 communicates with a tube 220 which extends into the outer atmosphere and in turn is connected to an adjustable reservoir 221, which together with the tube 220 and bellows diaphragm 215 is filled with a heat expansible fluid. It will thus be understood that the bellows diaphragm 215 will be maintained expanded during warm weather for holding the valve 210 in seated position as shown in the drawings, and will respond to a predetermined low degree of temperature for retracting the boss portion 217 so that the valve 210 may be unseated by a spring 222 acting on the valve.

*Operation of apparatus shown in Figs. 1 and 1A*

Assuming that the apparatus shown in Figs. 1 and 1A is in condition for operation with the various valve devices initially set in the positions shown, steam supplied through the supply pipe 25 under control of the governor 26 effects operation of the air compressor 10 in the usual manner to supply air under pressure to the pipe 27. Air under pressure flows from the pipe 27 through the branch pipe 51 to the chamber 48 of the timing valve device 12, and also flows from the pipe 27 to the central cavity 101 of the change-over valve device 16, as is best shown in Fig. 5 of the drawings. With the change-over valve device 16 positioned as shown in Fig. 5, air under pressure thus supplied to the cavity 101 flows therefrom through the pipe 149a to the piston chamber 187 of the valve actuating device 17, so that the piston 183 is operative to hold the piston rod 185, lever 190 and operating rod 199 in their uppermost position for positioning the reversing valve devices 155, 156 and 157 as shown in the drawings.

It will be noted that with the change-over valve device 16 positioned as shown in Fig. 5 of the drawings, the pipe 149b leading from the piston chamber 188 of the valve actuating device 17 is connected with the atmosphere by way of the cavity 230 and an atmospheric port 231.

At the same time, air under pressure supplied from the compressor through the pipe 27 to the central cavity 101 in the change-over valve device flows therefrom through the pipe 114 to the upper header 117 of the condenser assembly 19, and then through the cooling tubes 120, the lower condenser header 118, and the pipe 121 and check valve device 122 to the main reservoir 112. Referring to Fig. 8 of the drawings, since the pressure of air supplied from the pipe 121 through the branch pipe 121a to the chamber 127 within the bellows diaphragm 126 is greater than the air pressure in the valve chamber 123, which communicates with the main reservoir 112, the bellows diaphragm is maintained expanded against the force of the spring 130 for maintaining the slide valve 129 out of registration with the port 124. It will thus be understood that communication is maintained for the free flow of air under pressure from the lower header 118 of the condenser assembly 19 through the pipe 121 to the main reservoir 112.

The drain valve device 126 of the condenser assembly 19 is at the same time maintained in seated position, as shown in Fig. 7, by reason of the fact that the chamber 148 at the lower face of the piston 147 is open to the atmosphere via the pipe 149 and pipe 149b, so that the check valve 145 is held in engagement with the gasket 146 for preventing escape of air under pressure from chamber 139.

As air just delivered by the compressor is thus passed through the cooling tubes of the condenser assembly 19, the temperature of the air is reduced to substantially that of the atmosphere by reason of the dissipation of heat of compression therefrom into the draft of cooling air circulated over the tubes in the manner hereinafter explained. The water vapor carried by the compressed air is then precipitated on the inner walls of the tubes 120 and collects in lower header 118.

The other condenser assembly 18 is meanwhile rendered inactive or ineffective to supply air under pressure to the main reservoir, since communication to the pipe 113 at the changeover valve device 16 is cut off by the rotary valve element 94 as shown in Fig. 5 of the drawings. The pressure of air supplied through the pipe 149a and pipe 149 is effective to maintain the drain valve device 136 of the condenser assembly 18 in unseated position, as will be understood from the description hereinbefore presented in connection with Fig. 7 of the drawings. Any fluid contained in the lower header 118 of the inactive condenser assembly is thus free to flow therefrom through the drain valve device 136 and the associated discharge pipe 143. It will be understood that the check valve device 122 associated with the condenser assembly 18 is at this time positioned to prevent back flow of air under pressure from the main reservoir 112 by way of the pipe 121 leading to that condenser, the movement of the check valve device to closed position having already been explained with reference to Fig. 8 of the drawings.

As air under pressure is thus supplied from the compressor 10 through communications including those provided by the condenser assembly 19 to the main reservoir 112, as just explained, the steam turbine 159 is operated by steam supplied thereto from the supply pipe 25 shown in Fig. 1 through a branch pipe 233 for operating the blower device 21. The blower device 21 is thus operated to draw cool atmospheric air through the strainer and pipe 166, the rotary valve 155, and the conduit 167 to the chamber 115 within the housing of the condenser assembly 19, where the draft of air circulates about the cooling tubes 120. The cooling air thus supplied to the condenser 19 flows therefrom by way of the conduit 178, reversing valve device 157, and pipe 179 to the chamber 205 within the heating device 22, which functions to warm the air as already explained, assuming that the equipment is being operated during cold weather, and the heated air is then drawn through the pipe 206 to the blower device 21 and is forced thereby through the conduit 171, reversing valve device 156, and conduit 168 to the chamber 115 within the housing of the condenser assembly 18.

The heated air thus supplied to the chamber 115 of the condenser assembly 18 circulates over the condenser elements contained therein for melting any ice that may have formed in the various passages, so that complete discharge of foreign matter from the tubes 120 and headers of the condenser assembly 18 by way of the drain valve device 136 is insured. From the chamber 115 of the condenser assembly 18 the circulating air is returned to the atmosphere by way of the conduit 176, reversing valve device 157 and discharge pipe 175.

While the compressor 10 is being operated as just described, variations in fluid pressure created in the compression chamber 34 thereof are communicated through the pipe 33 to the chamber 32 of the lubricator device 11 for reciprocating the piston 29. Upon each inward stroke of the piston 30, the pawl 31 carried thereby cooperates with the toothed ratchet wheel 29 to rotate the wheel and the lug 37 thereon in a clockwise direction, so that each revolution of the ratchet wheel is timed in accordance with operation of the compressor through a given number of strokes. The lug 37 is thus brought into engagement with the lower end of the lever 38 on the completion of a given number of compressor strokes, and upon continued rotation of the ratchet wheel 39, the lever 38 is thereby turned about the shaft 39 and acts through the medium of the spring pressed pawl 41 to rotate the ratchet wheel 42 in a counterclockwise direction.

Referring to Fig. 4 of the drawings, as the shaft 39 is thus rotated in a counterclockwise direction, the cam 63 secured thereto, and also operating in counterclockwise direction as viewed in Fig. 4, is brought into operative engagement with the roller 67 carried by the toggle lever 65, which lever is then moved in a clockwise direction about the pin 66, stretching the spring 72 until the lever is carried beyond its dead center position, whereupon the spring 72 is permitted to contract and thereby to force the lever further in the clockwise direction and into engagement with the fluted stem 70, which is then lifted to effect movement of the valve 55 into engagement with the seat 62. As the valve 55 is thus moved away from the seat 57, air under pressure is supplied from the chamber 48 through the valve chamber 54 and pipe 53 to the piston chamber 86 of the valve actuating device 83 shown in Fig. 1A, the piston 85 being thereby shifted to the right against the force of the spring 91. In so moving, the piston 85 shifts the rod 88 and link member 89 to the right until one of the lugs 106 of the link member is brought into operative engagement with the corresponding pin 105 projecting from the shifting member 103 of the change-over valve device 16. On movement of the link member from the position illustrated in Fig. 1A for example, the upper lug 106 will cooperates with the upper pin 105. Continued movement of the piston 85 and associated elements then effects canting of the link member about the pin 90, while causing rotation of the member 103 and of the valve elements connected thereto in a clockwise direction to the other position of the change-over valve device, as illustrated in Fig. 6. It will be noted that the rod 107 is at the same time adapted to yield on engagement with the upper pin 109 on the portion 110.

The cam 63 of the timing valve device 12 meanwhile turns out of engagement with the roller 67 and into engagement with the roller 79, and thereby tilts the lever 77 in a clockwise direction about the pin 78 for causing the lug 80 to act downwardly on the toggle lever 65 for turning the lever in a counterclockwise direction until it is carried past its dead center position, thus rendering spring 72 effective to pull the lever to the normal position, as shown in Fig. 4. The timing valve mechanism is thus reset in preparation for repeated operation upon the next revolution of the cam 63, while the spring 56 is permitted to operate the valve 55 for venting the chamber 86 of the cylinder 84 (see Fig. 1A), so that piston 85 and the associated rod 88 and link member 89 are again retracted by the spring 91. It will be apparent that, as the link member 89 is thus pulled to the left from the position illustrated in Fig. 6, the spring or rod 107 coacts with the upper pin 109 to force the link member in a clockwise direction about pin 90 until it is again substantially centered with respect to the pins 105, so that when the operation just described is repeated, the link member will then be adapted to cooperate with the lower of said pins to effect turning of the change-over valve in the other direction.

Referring to Fig. 5 of the drawings, as the connected rotary valve elements 94 and 96 are thus rotated in a clockwise direction to the other position thereof, communication is established from the central cavity 101 to the pipe 113 which leads to the condenser assembly 18, while communication from the cavity to the pipe 114 is cut off. At the same time, the central cavity 101 is also connected to the pipe 149b and the pipe 149a is connected with the atmosphere by way of a cavity 235 and the atmospheric port 231. Referring again to Fig. 1A, air under pressure supplied by the compressor is thus diverted through the pipe 113 leading to the condenser assembly 18 and flows through the header 117, cooling tubes 120, header 118 and check valve device 122 of that condenser assembly and by way of pipe 121 to the main reservoir 112, it being understood that the check valve device 122 is automatically moved to open position in the manner already described.

With the supply of air to the pipe 114 leading to the other condenser assembly 19 cut off, upon the unseating of the drain valve device 136 under the pressure of air supplied from the pipe 149b and pipe 149 the moisture previously condensed in the cooling tubes 120 of the condenser 19 and accumulated in the header 118 is discharged past the unseated valve and through the discharged pipe 143 under the pressure of air trapped in the pipe 114 and the various communications of the condenser assembly. The check valve device 122 of the condenser assembly 19 is of course automatically moved to its closed position for preventing back flow of air under pressure from the main reservoir.

At the same time, with the pipe 149b connected by way of the change-over valve device 16 to the supply of air under pressure, the consequent increase in fluid pressure in the piston chamber 188 of the valve actuating device 17 effects downward movement of the piston 184, rod 185 and the connected piston 183, and the lever 190, operating rod 199 and associated valve levers are thereby operated to effect counterclockwise rotation of each of the rotary valve elements 163, 170 and 173, of the respective reversing valve devices. The positions of the valve devices 155, 156 and 157 are thus changed, so that the circulation of atmospheric air through the condenser assemblies is reversed, the flow of air being by way of the strainer and pipe 166, valve device 155, conduit 168, chamber 115 of the condenser assembly 18, conduit 176, valve device 157, conduit 179, through the heating device 22, where the current of air may be heated, and thence through the conduit 206 to the blower device 21. From the blower device the warm air is forced through the conduit 171, valve device 156 and conduit 167 to the chamber 115 of the other condenser assembly 19, thereby insuring thawing and complete discharge of accumulated frozen moisture from the condenser communications. Air thus circulated through the condenser assembly 19 is discharged therefrom by way of the conduit 173, valve 157 and pipe 175.

As the compressor 10 continues in operation it will be apparent that after an interval of time the lug 37 of the lubricating device 11 will again engage the lever 38 and thereby operate the timing valve device 12 to cause a shift from condenser assembly 18 to condenser assembly 19.

From the foregoing it will be apparent that a compressed air dehydrating apparatus constructed according to my invention is operative automatically, during such time as the locomotive compressor functions to supply air under pressure for the air brake system, to effect removal of water vapor contained in the compressed air by circulating the air immediately after delivery thereof from the compressor through one automatically cooled condenser for a predetermined time, after which interval the flow of air compressed by the compressor is diverted through another cooled condenser while the first condenser is automatically cleared of accumulated moisture in preparation for subsequent operation.

Figure 9:
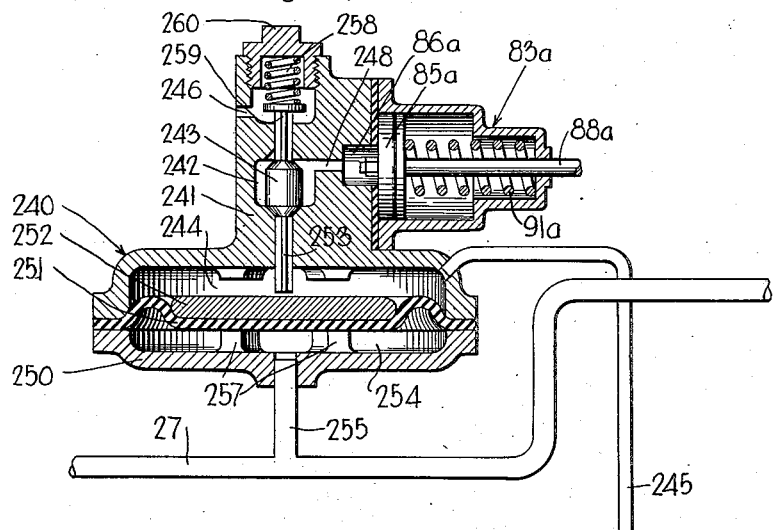
Figs. 9 and 10 are diagrammatic views, partly in section, showing a modification wherein a fluid pressure operated valve device controlling the change-over valve mechanism is adapted for use with my improved air dehydrating apparatus.
Figure 10:
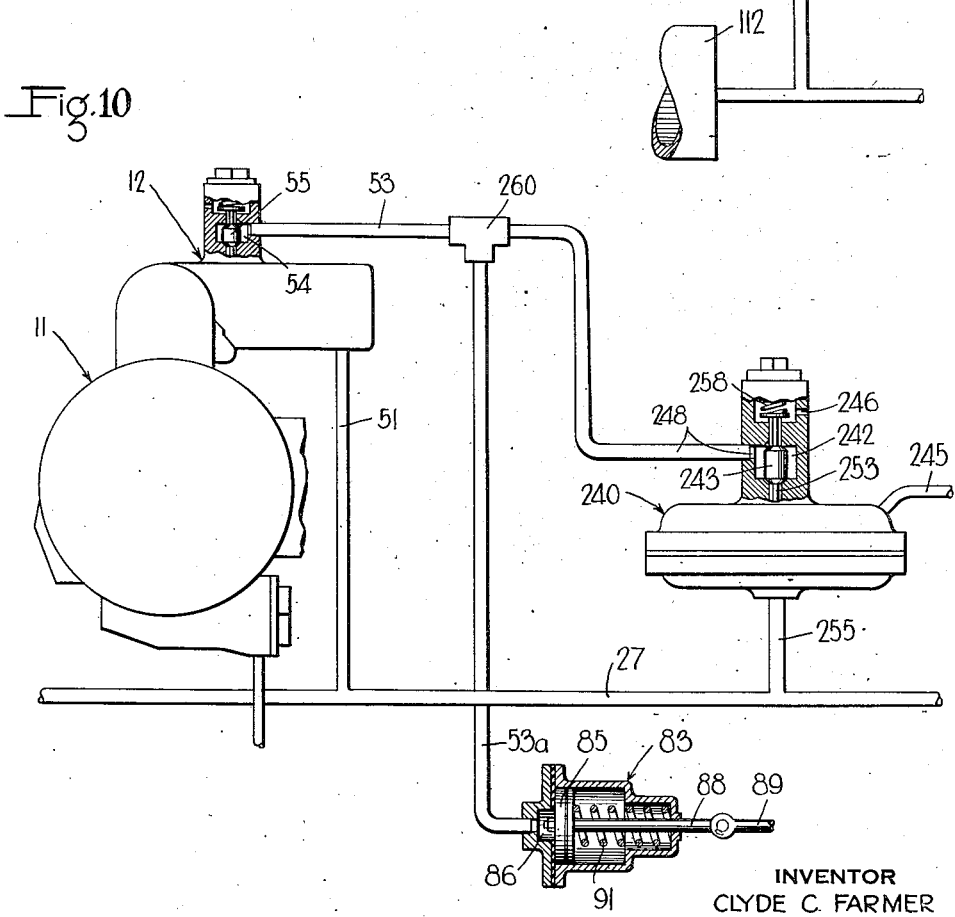

In Figs. 9 and 10 of the drawings there are disclosed slightly different forms of an auxiliary valve device controlling operation of the change-over valve device 16 shown in Fig. 1A, which auxiliary valve device is adapted to operate in response to a difference in pressure of air entering a condenser from that of air discharge therefrom, such as might result from clogging of the condenser by precipitated moisture.

Referring to Fig. 9, the auxiliary valve device is indicated generally at 240, and comprises a casing 241 having formed therein a valve chamber 242 containing a double seating valve 243, which is adapted to control communication to the valve chamber from either a chamber 244 communicating through a pipe 245 with the main reservoir 112, or to an atmospheric exhaust passage 246. The valve chamber 242 is at all times open by way of a passage 248 with a piston chamber 86a which is formed at one face of a piston 85a of a changeover valve actuating device 83a, which it will be noted is similar to and performs the same functions as the valve actuating device 83 shown in Fig. 1A of the drawings. Interposed between the casing 241 and a cover plate 250 is a flexible diaphragm 251, which has associated therewith a follower member 252 disposed in operative alignment with the end of a fluted stem 253 extending from the double beat valve 243. The diaphragm 251 is subject to the opposing pressures of air in the chamber 244 and of air in a chamber 254 which communicates through a pipe 255 with the compressed air supply pipe 27.

Under normal operating conditions, when the pressure of air in the lower chamber 254 is substantially equal to the pressure of main reservoir air in the chamber 244, the flexible diaphragm 251 is adapted to remain in the position shown in Fig. 9 wherein the diaphragm rests upon a plurality of supporting lugs 257 formed on the cover plate 250 while the follower member 252 is held out of engagement with the stem 253. At the same time, a spring 258 interposed between a fluted stem 259 of the double beat valve 243 and a cap nut 260 carried by the casing is effective to maintain the double beat valve in its lower seated position, as viewed in Fig. 9, for cutting off communication between the chamber 244 and valve chamber 242, while connecting the valve chamber to the atmospheric exhaust passage 246. With the piston chamber 86a thus vented to atmosphere, the piston 85a and piston rod 88a are held by the spring 91a in retracted position as shown in Fig. 9.

It will be understood that compressed air may in the meantime be supplied by the compressor through the pipe 27 and circulated through one of the pair of condensers and supplied from there to the main reservoir 112 in the manner hereinbefore explained. As moisture is precipitated within the cooling tubes of the condenser, during operation for a considerable period and particularly during cold weather when the precipitated moisture becomes frozen, the resultant clogging of the condenser cooling tubes may so impede the flow of compressed air therethrough as to cause the pressure of air backed up in the compressor supply pipe 27 to exceed that of air in the main reservoir 112.

When the pressure of air in the supply pipe 27 and in the connected chamber 254 of the control valve device 240 thus becomes greater than the main reservoir pressure acting in the chamber 244, the diaphragm 251 is moved upwardly, thereby effecting movement of the valve 43 to its upper seated position against the force of the spring 248, so that the atmospheric communication from the chamber 242 is cut off while air under pressure is supplied from chamber 244 through the chamber and passage 248 to the piston chamber 86a. The pressure of air in the chamber 86a then forces the piston 85a and piston rod 88a toward the right-hand as viewed in Fig. 9, this operation effecting movement of the change-over valve device to another position as already explained, so that the circulation of the compressed air is diverted from the clogged condenser assembly and continued by way of the other condenser assembly. It will be understood that this condenser assembly has already been conditioned to provide free flow of the air under pressure therethrough, so that the opposing pressures acting on the diaphragm 251 are substantially equalized with the result that the control valve device 240 again assumes the normal position as shown in Fig. 9.

Referring to Fig. 10, the auxiliary control valve device 240 is illustrated in combination with other elements of the equipment including the automatically operated timing valve device 12 which is controlled through the medium of the compressor lubricator device 11 as shown in Fig. 1 of the drawings. With the apparatus arranged as shown in Fig. 10, the valve chamber 242 of the auxiliary control valve device 240 communicates by way of passage and pipe 248, a double check valve device 260 and a pipe 53a with the piston chamber 86 of the change-over valve actuating device 83. The double check valve 260 also controls communication from the valve chamber 54 of the timing valve device 12 by way of the pipe 53 to the pipe 53a.

The operation of the apparatus in the form disclosed in Fig. 10 will be understood from the description hereinbefore presented in connection with other features of the invention. It will thus be apparent that under normal conditions, the timing valve device 12 will function as already described to effect periodic supply and release of air under pressure to and from the piston chamber 86 of the valve actuating device 83 by way of the pipe 53, double check valve 260 and pipe 53a, the double check valve device 260 being of course positioned to cut off communication to the pipe 248. In the event, however, that one of the condenser assemblies should prematurely become clogged with frozen condensate, the auxiliary control valve device 240 will be automatically rendered operative as hereinbefore explained in connection with Fig. 9, and air under pressure will thereby be supplied by way of the pipe 248, the check valve device 260 and pipe 53a for operating the change-over valve actuating device 83, the double check valve device this time cutting off communication to the pipe 53.

While one embodiment of the invention and several modifications thereof have been described, it is not my intention to limit my invention to that embodiment or otherwise than by the scope of the appended claims.

Having now described my invention, what I claim as new and desire to secure by Letters Patent, is:

1. A dehydrating apparatus comprising in combination, two condenser devices adapted to precipitate moisture from compressed air passed therethrough, a timing mechanism operative to render first one and then the other of said two condensers effective to precipitate moisture from compressed air passed therethrough, means for freeing the inactive condenser of moisture content while it is inactive, and means operative to cut the inactive condenser into operation in the event that the active condenser becomes clogged irrespective of operation of said timing mechanism.

2. Apparatus for dehydrating fluid compressed by a compressor for use in a fluid pressure system, comprising a condenser through which fluid compressed by the compressor may be conducted to the fluid pressure system, change-over valve means controlling the flow of fluid to said condenser, cooling means automatically operative during said supply of fluid under pressure to said condenser to circulate a fluid cooling medium thereover for absorbing heat of compression from the fluid under pressure, check valve means preventing back flow of fluid from the fluid pressure system to said compressor, and normally closed drain valve means operative, in response to movement of said change-over valve means for cutting off the supply of fluid under pressure to said condenser, to effect discharge of accumulated condensate from said condenser.

3. Apparatus for dehydrating fluid compressed by a compressor for use in a fluid pressure system, comprising a condenser providing communication through which fluid under pressure may be conducted from the compressor to the fluid pressure system, heat exchange means operative to effect circulation of either cool or heated air in thermal contact with said condenser, a fluid pressure operated drain valve device controlling the discharge of precipitated moisture from said condenser, and control valve means having one position for supplying fluid under pressure from the compressor to said condenser while effecting operation of said heat exchange means to circulate cool air about said condenser, and having another position for cutting off the flow of fluid under pressure to said condenser while supplying fluid under pressure to said drain valve device and causing operation of said air circulating means to pass heated air about said condenser.

4. Apparatus for dehydrating fluid compressed by a compressor for use in a fluid pressure system, comprising an insulated housing having a chamber, a cooling condenser mounted within said chamber and adapted to provide communication through which fluid under pressure may be delivered by the compressor to the fluid pressure system, a check valve device mounted within said chamber for preventing back flow of fluid under pressure to said condenser, a normally closed drain valve device mounted within said chamber and operative on an increase in fluid pressure to discharge accumulated condensate from said condenser, blower means operable to circulate either a cooling medium or a warming medium to said chamber, and a change-over valve mechanism operative in one position to maintain communication for the supply of fluid under pressure from the compressor to said condenser while conditioning said blower means to circulate the cooling medium through said chamber, and operative in another position to cut off the supply of fluid under pressure to said condenser and to supply fluid under pressure to said drain valve device while conditioning said blower means to circulate the warming medium to said chamber.

5. A compressed air dehydrating apparatus comprising a reservoir adapted to be supplied with air under pressure, a pair of cooling condensers adapted to conduct compressed air to said reservoir, automatic change-over valve mechanism operable to supply compressed air sequentially to each of said condensers in turn, means operatively interlocked with said change-over valve mechanism for circulating a current of initially cool fluid in thermal contact first with the condenser conducting fluid under pressure and then with the inactive condenser, and thermosatically controlled heating means operative during cold weather for warming the current of fluid in advance of its circulation about the inactive condenser.

6. In a fluid pressure system involving a compressor and a receiving reservoir, in combination, a pair of condenser assemblies each including cooling tubes adapted to conduct fluid under pressure from the condenser to the reservoir, a check valve preventing back flow of fluid from the reservoir to the tubes and a fluid pressure responsive drain valve device adapted for operation to discharge condensate accumulated in said tubes, and a change-over valve mechanism operable alternately to render one of said condenser assemblies active and the other inactive, by supplying fluid compressed by the compressor to the tubes of the active condenser, and preventing flow of fluid under pressure to the tubes of the inactive condenser assembly while supplying fluid under pressure to the associated drain valve device.

7. In a fluid pressure system involving a compressor and a receiving reservoir, in combination; a pair of condenser assemblies individually including cooling tubes adapted to conduct fluid under pressure from the compressor to the reservoir, a check valve preventing back flow of fluid from the reservoir to the tubes and a fluid pressure responsive drain valve device adapted for operation to discharge condensate accumulated in said tubes; a change-over valve mechanism operable to render alternately one of said condenser assemblies active and the other inactive by supplying fluid compressed by the compressor to the tubes of the active condenser and preventing flow of fluid under pressure to the tubes of the inactive condenser assembly while supplying fluid under pressure to the associated drain valve device; and means operatively interlocked with said change-over valve mechanism for simultaneously circulating a cooling medium about said active condenser assembly and a thawing medium about said non-active condenser assembly.

8. In a fluid pressure equipment involving a compressor adapted for intermittent operation and a receiving reservoir, in combination, a pair of cooling condensers interposed in parallel between the compressor and the reservoir, a change-over valve mechanism operable to establish communication from the compressor alternately through each of said condensers to the reservoir while cutting off communication to the other condenser, timing means automatically operable during operation of the compressor for periodically operating said change-over valve mechanism, and auxiliary safety means operative upon a predetermined restriction in flow of fluid under pressure to the first-named or active condenser to actuate said change-over valve mechanism independently of said timing means.

9. In a fluid pressure equipment involving a compressor adapted for intermittent operation and a receiving reservoir, in combination, a pair of cooling condensers interposed in parallel between the compressor and the reservoir, a change-over valve mechanism including a rotary valve operable to establish communication from the compressor alternately through each of said condensers to the reservoir while cutting off communication to the other condenser, and means for actuating said change-over valve mechanism comprising an oscillatory shifting member connected to said rotary valve, a retractable link operatively aligned therewith, a movable abutment subject to fluid pressure in the chamber for reciprocating said link, and automatic valve mechanism for controlling the supply and release of fluid under pressure to and from said chamber.

10. In an air compressing equipment involving a compressor, a mechanical compressor lubricator automatically operated thereby, and a receiving reservoir, the combination therewith of a pair of cooling condensers interposed in parallel between the compressor and the reservoir, a change-over valve device operable to supply fluid delivered by the compressor alternately through each of said condensers to the reservoir while cutting off communication to the other condenser, fluid pressure operated means for actuating said change-over valve mechanism, and timing valve means controlled by said lubricator for intermittently supplying and releasing fluid under pressure to and from said fluid pressure operated means.

11. In a fluid pressure system involving a compressor and a receiving reservoir, in combination; a pair of condenser assemblies individually including cooling tubes adapted to conduct fluid under pressure from the compressor to the reservoir, a check valve preventing back flow of fluid from the reservoir to the tubes and a fluid pressure responsive drain valve device adapted for operation to discharge condensate accumulated in said tubes; a change-over valve mechanism operable to render alternately one of said condenser assemblies active and the other inactive by supplying fluid compressed by the compressor to the tubes of the active condenser and preventing flow of fluid under pressure to the tubes of the inactive condenser assembly while supplying fluid under pressure to the associated drain valve device; and means operatively interlocked with said change-over valve mechanism for circulating a current of initially cool fluid in thermal contact first with the condenser active in conducting air under pressure and then with the inactive condenser.

12. In a fluid pressure system involving a compressor and a receiving reservoir, in combination; a pair of condenser assemblies individually including cooling tubes adapted to conduct fluid under pressure from the compressor to the reservoir, a check valve preventing back flow of fluid from the reservoir to the tubes and a fluid pressure responsive drain valve device adapted for operation to discharge condensate accumulated in said tubes; a change-over valve mechanism operable to render alternately one of said condenser assemblies active and the other inactive by supplying fluid compressed by the compressor to the tubes of the active condenser and preventing flow of fluid under pressure to the tubes of the inactive condenser assembly while supplying fluid under pressure to the associated drain valve device; and a heat exchange system operatively interlocked with said change-over valve mechanism and comprising means for circulating cooled air through the active condenser and means for then warming the same air and circulating it through the inactive condenser.

13. In an equipment for cooling and dehydrating fluid compressed by a compressor for delivery to a receiving reservoir, in combination; a plurality of condensers, each comprising cooling tubes interposed between the compressor and the reservoir and a housing having air inlet and outlet openings; selector valve means automatically responsive to operation of the compressor to cause flow of fluid under pressure from the compressor through the cooling tubes of each condenser in succession; and apparatus cooperative with said selector valve means for simultaneously circulating cool air through the housing of an active condenser and hot air through the housing of an inactive condenser, said apparatus including a valve operable to supply cool air from the atmosphere to the inlet of an active condenser housing, air heating means, a valve operable to supply hot air therefrom to the inlet of an inactive condenser housing, and a valve operable to establish communication from the outlet of the active condenser housing to said air heating means while connecting the outlet of the inactive condenser housing to a discharge communication.

14. In an equipment for cooling and dehydrating fluid compressed by a compressor for delivery to a receiving reservoir, in combination; a plurality of condensers, each comprising cooling tubes interposed between the compressor and reservoir and a housing having air inlet and outlet openings; control valve means automatically operative to direct flow of fluid under pressure from the compressor through the cooling tubes of each condenser in succession; and heat exchange apparatus including a valve operable to supply cool air from the atmosphere to the inlet of an active condenser housing, air heating means, a valve operable to supply hot air therefrom to the inlet of an inactive condenser housing, a valve operable to establish communication from the outlet of the active condenser housing to said air heating means while connecting the outlet of the inactive condenser housing to a discharge communication, and movable abutment means subject to opposing fluid pressures varied in accordance with changes in the flow of fluid through the respective condensers for actuating said three valves simultaneously.

15. In a fluid pressure system involving a compressor and a receiving reservoir, in combination; a pair of condenser assemblies each including cooling tubes adapted to conduct fluid under pressure from the condenser to the reservoir, a heat insulated housing for each condenser assembly having air inlet and outlet openings, change-over valve means automatically responsive to operation of the compressor to effect flow of fluid under pressure from the compressor alternately through the tubes of one condenser while isolating the other, and apparatus cooperative with said change-over valve means for effecting simultaneous circulation of cool air through the housing of the active compressor and hot air through the housing of the isolated condenser, said apparatus including a blower device operative during operation of the compressor, an inlet valve operable to direct cool air set in motion by said blower device to the air inlet of the active condenser housing, heating means, a two-way valve operable to establish communication from the active condenser housing to said heating means and also from the isolated condenser housing to the atmosphere, and a valve operable to direct air from said heating means to said isolated condenser housing.

16. In a fluid pressure system involving a compressor and a receiving reservoir, in combination; a pair of condenser assemblies each including cooling tubes adapted to conduct fluid under pressure from the condenser to the reservoir, a heat insulated housing for each condenser assembly having air inlet and outlet openings, change-over valve means automatically responsive to operation of the compressor to effect flow of fluid under pressure from the compressor alternately through the tubes of one condenser while isolating the other, and apparatus for effecting simultaneous circulation of cool air through the housing of the active condenser and hot air through the housing of the isolated condenser, said apparatus including a blower device actuated during operation of the compressor, an inlet valve operable to direct cool air driven by said blower device to the air inlet of the active condenser housing, heating means, a two-way valve operable to establish communication from the active condenser housing to said heating means and also from the isolated condenser housing to the atmosphere, a valve operable to direct air from said heating means to said isolated condenser housing, and a fluid pressure motor controlled by said change-over valve means for actuating said three valves.

17. In a fluid pressure system involving a compressor and a receiving reservoir, in combination; a pair of condenser assemblies each including cooling tubes adapted to conduct fluid under pressure from the condenser to the reservoir, a heat insulated housing for each condenser assembly having air inlet and outlet openings, change-over valve means automatically responsive to operation of the compressor to effect flow of fluid under pressure from the compressor alternately through the tubes of one condenser while isolating the other, and apparatus for effecting simultaneous circulation of cool air through the housing of the active condenser and hot air through the housing of the isolated condenser, said apparatus including a blower device actuated according to operation of the compressor, an inlet valve operable to direct cool air driven by said blower device to the air inlet of the active condenser housing, heating means, a two-way valve operable to establish communication from the active condenser housing to said heating means and also from the isolated condenser housing to the atmosphere, a valve operable to direct air from said heating means to said isolated condenser housing, lever means operatively connected to said three valves, and a fluid pressure motor controlled by said change-over valve means for actuating said lever means.

CLYDE C. FARMER.